Patented July 20, 1926.

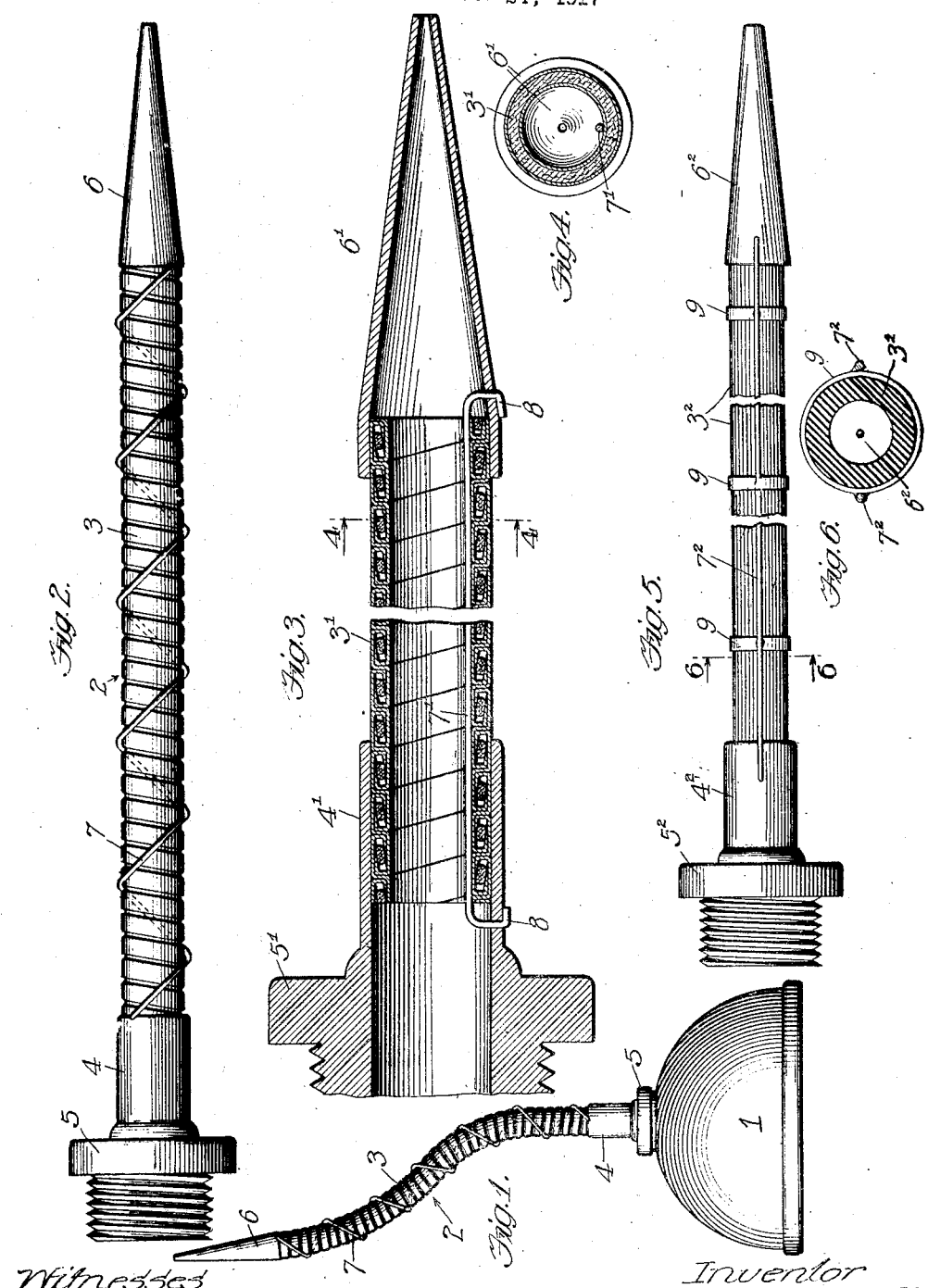

1,593,016

UNITED STATES PATENT OFFICE.

ROBERT H. CAMPBELL, OF CHICAGO, ILLINOIS.

SPOUT.

Application filed October 24, 1917. Serial No. 198,202.

This invention relates to flexible spouts.

The object of the invention is to provide a spout made of flexible tubing which is reinforced and strengthened by a separate supporting member or element applied thereto, which is flexible under pressure, substantially non-resilient, and sufficiently rigid to retain its shape unsupported, whereby it is possible to use light weight and relatively inexpensive tubing for making said spouts. More specifically, the object of the invention is to provide for making spouts of the type specified from relatively light and cheap spirally wound metal tubing.

To effect the objects of the invention, a spout of my invention comprises the various features and details of construction hereinafter described and claimed.

In the accompanying drawing, in which my invention is fully illustrated,

Figure 1 is an oil can comprising a spout of my invention.

Figure 2 is a separate view of a spout like that shown in Fig. 1, on an enlarged scale.

Figure 3 is an enlarged central, longitudinal sectional view of a spout embodying my invention in modified form.

Figure 4 is a sectional view thereof on the line 4—4 of Fig. 3,

Figure 5 is a side view of still another form of spout embodying my invention; and Figure 6 is a sectional view thereof on the line 6—6 of Fig. 5.

For purposes of definite illustration, I have, in Fig. 1 of the drawings, shown a spout of my invention as applied in use to an oil can. I desire it to be understood, however, that the application shown is illustrative only, and that I do not thereby wish or intend to limit myself to the particular application shown, as my improved spout admits of general use and application and my invention contemplates all possible uses for which it is adapted.

Referring now particularly to Figs. 1 and 2 of the drawing, in which I have shown what I now consider to be the preferable form of spout of my invention, 1 designates the body of an oil can or other receptacle and 2 designates, as a whole, the spout thereof.

Said can 1 may be made of any desired or suitable material, being usually made of sheet metal.

The spout 2 consists of a section of spirally wound metal tubing 3, the inner end of which is soldered into a sleeve 4 forming part of a hollow nut 5 adapted for screw threaded engagement with a correspondingly screw threaded hole in the cam 1, and to the outer end of which is soldered a nozzle 6.

The tube 3 is reinforced and strengthened by means of a rod or wire 7, preferably annealed steel wire, opposite ends of which are soldered or otherwise attached to the sleeve 4 and the nozzle 6. The wire 7 is flexible, substantially non-resilient and will be of such size in cross-section that it will be sufficiently rigid to retain its shape without other support under all conditions of use for which it may be designed.

By making the rod or wire sufficiently strong and rigid, the tube 3 will be wholly supported thereby and may, therefore, be made of the lightest possible gauge metal and the cost thereof reduced to a minimum.

Instead of the spirally wound wire 7, I contemplate the use of one or more rods or wires which extend substantially parallel with the axis of the tube and which may be applied either inside or outside of said tube.

One such modification is shown in Figs. 3 and 4 of the drawings, in which 3' designates the tube which forms the spout proper, preferably made of spirally wound metal tubing, but which may be made of any kind of tubing desired, 4' the sleeve on the attaching nut 5' into which the inner end of the tube 3' is connected, and 6' the nozzle at the outer end of said tube.

In accordance with the present modification, the supporting wire, designated 7', and which, as in the preferred form of my improved spout, is preferably made of annealed steel wire, consists of a single substantially straight piece of rod or wire which extends lengthwise through the tube 3' and the opposite ends of which are rigidly connected to the sleeve 4' and the nozzle 6'. Convenient means, as shown, for connecting the ends of said wire 7' to said sleeve and nozzle, consists in bending the ends thereof at about right angles and inserting said bent ends through holes formed in said sleeve and nozzle beyond the ends of the tube 3'. The projecting ends of said rod are then bent down into contact with the sides of said sleeve and nozzle, as shown at 8, and are soldered thereto.

Obviously more than one wire 7' may be used, if desired.

Another modification of my improved spout is shown in Figs. 5 and 6 of the drawings, in which 3² designates the tube forming the spout, consisting, as shown, of a piece of rubber tube, 4² the sleeve on the attaching nut 5², into which said tube is connected, 6² the nozzle at the outer end of said tube and 7² supporting rods or wires for said tube, made of annealed steel rods, as in the other forms of my improved spout.

In accordance with the present modification, said rods or wires 7² are arranged outside of the tube 3², one at each side thereof, and opposite ends of said rods or wires are soldered or otherwise connected to the sleeve 4² and the nozzle 6². Also, to prevent the tube 3² from sagging away from the rods or wires 7² between its ends, said tube is inserted through spaced rings 9 soldered or otherwise rigidly connected to the rods 7², which will prevent sagging of said tube, in an obvious manner.

In spouts embodying my invention in any of the forms or modifications herein shown and described, it is obvious that the reinforcing member is applied to the flexible tubing forming the body portion of the spout in such manner that it will not obstruct the flow endwise through said spout.

Also, by engaging said supporting member with the flexible tube forming the body portion of the spout between its ends, as shown in Figures 2, 5 and 6, it is obvious that said tube and supporting member will bend as a unit instead of separately, thereby preventing distortion of said flexible tubing and supporting member relatively to each other, as might otherwise be the case.

Also, in the modification shown in Figures 3 and 4, while the flexible tube and supporting member are not connected between their ends, so as to bend together, it is obvious that flexure of said tube relative to the supporting member will be limited to sagging of the tube between its ends to an extent not greater than the inside diameter of said tube. Thus, said supporting member will, in fact, limit the flexure of the tubular member.

I claim:—

1. A spout made of flexible tubing, and a separate supporting member applied to and wound spirally around said tube, said supporting member being flexible, substantially non-resilient and sufficiently rigid to retain its shape and to support said tube under contemplated conditions of use.

2. A spout made of flexible tubing, and a separate supporting element therefor, consisting of substantially non-resilient wire wound spirally around said tube, said wire being of sufficient size to retain its shape and to support said tube under contemplated conditions of use.

3. A spout made of flexible tubing, an attaching sleeve to which one end of said tube is connected, a nozzle secured to the opposite end thereof, and a separate supporting member applied to said tube, the opposite ends of which are connected to said sleeve and nozzle, respectively, said supporting member being flexible, substantially non-resilient and sufficiently rigid to retain its shape and to support said tube under contemplated conditions of use.

4. A spout made of flexible tubing, an attaching sleeve to which one end of said tube is connected, a nozzle secured to the opposite end thereof, and a separate supporting member applied to and wound spirally around said tube, the opposite ends of which are connected to said sleeve and nozzle, respectively, said supporting member being flexible, substantially non-resilient and sufficiently rigid to retain its shape and to support said tube under contemplated conditions of use.

5. A spout made of flexible tubing, an attaching sleeve to which one end of said tube is connected, a nozzle secured to the opposite end thereof, and a separate supporting member therefor consisting of substantially non-resilient wire wound spirally around said tube opposite ends of which are connected to said sleeve and nozzle, respectively, said wire being of sufficient size to retain its shape and to support said tube under contemplated conditions of use.

6. A spout consisting of a tubular body member having a nozzle attached to one end and an attaching nipple connected to its other end, said body member consisting of a spirally-wound metal strip having a spiral oil-tight joint, the body member being thereby adapted to be flexed laterally in any direction with respect to the attaching member but being insufficiently rigid to hold its bent shape in ordinary use without assistance, and a supporting wire anchored to said attaching member and extending substantially to the outer end of the body member where it has a supporting engagement with the outer end of the spout to thereby prevent the nozzle having a lateral movement independently of said supporting wire, said wire being bendable but substantially non-resilient and sufficiently rigid to retain a bent position.

7. A spout consisting of a body member having a nozzle attached to its outer end and an attaching device connected to its inner end, said body member consisting of a spirally-wound metal member having an oil-tight spiral joint to thereby permit the body member to be flexed in any direction without destroying the oil-tightness of said joint, this body member being insufficiently rigid to hold its bent shape in ordinary use without assistance, and a device for holding and sustaining the body member in any position it may be bent into, said device consisting of a ductile wire anchored at its inner end to said attaching member and extending to near the outer end of the spout where it has supporting engagement with the outer end of the spout to thereby prevent said outer end from having any free movement independently of said wire, said wire being free of the coils of said body member to thereby permit the body member to flex without interference by said wire.

8. A hand oil-can having a spout consisting of a tubular body member having a nozzle attached to its outer end and an attaching-nipple connected to its inner end, said body member consisting of a spirally-wound metal strip having a spiral oil-tight joint to thereby adapt the spout to be flexed laterally in any direction with respect to the attaching member without destroying the oil-tightness of the joint.

9. A hand oil-can having a spout consisting of a tubular body member having a nozzle attached to its outer end and an attaching-nipple connected to its inner end, said body member consisting of a spirally-wound metal strip having a spiral oil-tight joint to thereby adapt the spout to be flxed laterally in any direction with respect to the attaching member without destroying the oil-tightness of the joint, and a supporting wire anchored to said attaching member and extending substantially to the outer end of the spout and being bendable but substantially non-resilient and sufficiently rigid to retain a bent position.

In testimony that I claim the foregoing as my invention, I affix my signature this 22nd day of October 1917.

ROBERT H. CAMPBELL.